L. C. MOORE.
KETTLE COVER DRAINER AND HOLDER.
APPLICATION FILED AUG. 28, 1919.
1,349,084.
Patented Aug. 10, 1920.
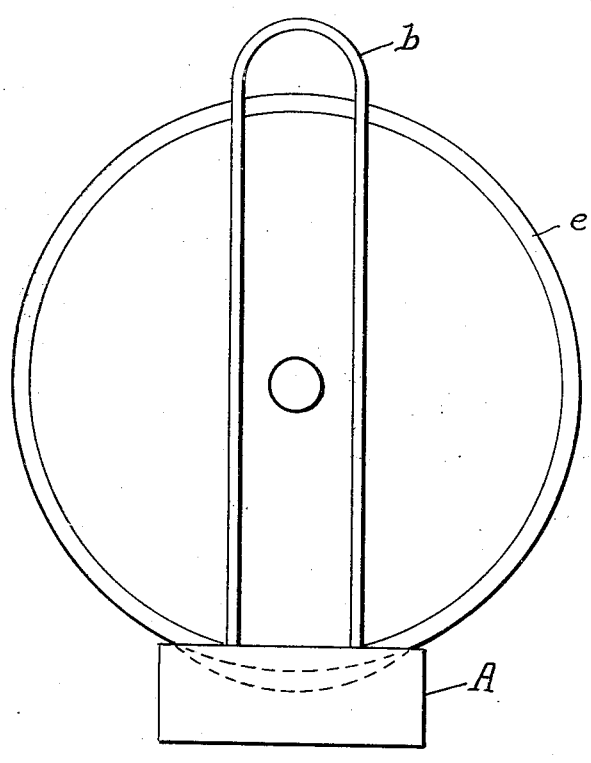
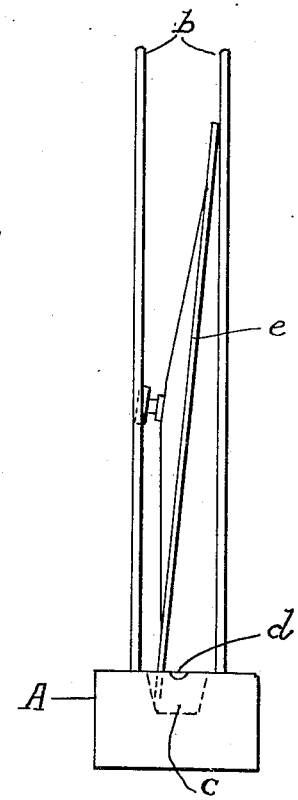
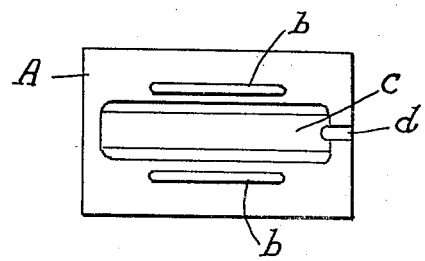
Inventor
Lena C. Moore
by
F. N. Gillett
Attorney.

UNITED STATES PATENT OFFICE.

LENA C. MOORE, OF BINGHAMTON, NEW YORK.

KETTLE-COVER DRAINER AND HOLDER.

1,349,084.     Specification of Letters Patent.     Patented Aug. 10, 1920.

Application filed August 28, 1919. Serial No. 320,349.

*To all whom it may concern:*

Be it known that I, LENA C. MOORE, a citizen of the United States, residing at Binghamton, in the county of Broome and State of New York, have invented certain new and useful Improvements in Kettle-Cover Drainers and Holders, of which the following is a specification.

My invention relates to improvements in kettle cover drainers and holders; and it has for its object to provide a portable, handy, easily constructed support for the cover while draining, and a receptacle to receive the drainage from the cover, to be placed on the stove or other convenient place, for use by the house wife, while lifting the cover from the pot or kettle for any purpose while cooking. With these objects in view, my invention consists in certain novel features of construction and arrangement of parts as will be hereinafter fully described and pointed out, reference being had to the accompanying drawings, in which:

Figure 1, is a side elevation of my device.

Fig. 2 is an end elevation of my device, with a kettle cover in place.

Fig. 3 is a plan view of my device. The same reference characters denote like parts in each of the several figures of the drawings.

In carrying out my invention, I provide, the base A, having mounted thereupon the parallel bent wire upright, b. b; the base support A has let into its upper surface, the elongated cup shaped recess C, having the mouth d, at one end thereof, or at both ends.

It is well known that in cooking in a pot or kettle, the kettle cover or lid gathers a certain amount of moisture or liquid grease, from the cooking receptacle, which when the cover is removed, must drain down around the edge of the cover, or is rubbed off on to any surface with which the cover may come in contact, when removed from the kettle. In my device, the holder stands on the stove or at any convenient place, and when the lid is removed, it is placed on the holder base A, between the two guards b, b, and thus in this inclined position, safely supported, its lower edge rests within the cup shaped recess C, while the moisture or liquid grease gathered on the same, drains down around the edge of the cover, and so drops into the cup shaped recess in the base. The drippings gathered in the cup, may be wiped out or removed at any convenient time, while the lid is always in handy position, to be replaced on the kettle. The base may be of metal preferably or of wood; the cup shaped recess may be oval in shape, with a channel at one end for draining off the collected contents.

Having thus described my invention, what I claim as new and for which a patent is desired is as follows:

1. In a kettle cover drainer, a base, having let into its upper surface an oval cup shaped recess; two vertical parallel bent wire supports, mounted in the surface, one support on either side of the recess, a mouth extending outward from one end of the recess in the surface of the base.

2. In a kettle cover drainer, a metallic base, having an oval cup shaped recess in its upper surface, vertical bent wire supports, mounted on the upper surface of the base on either side of the cup, a mouth extending from the drain cup outward on the upper surface of the base.

In testimony whereof I have affixed my signature.

LENA C. MOORE.